Figure 1:
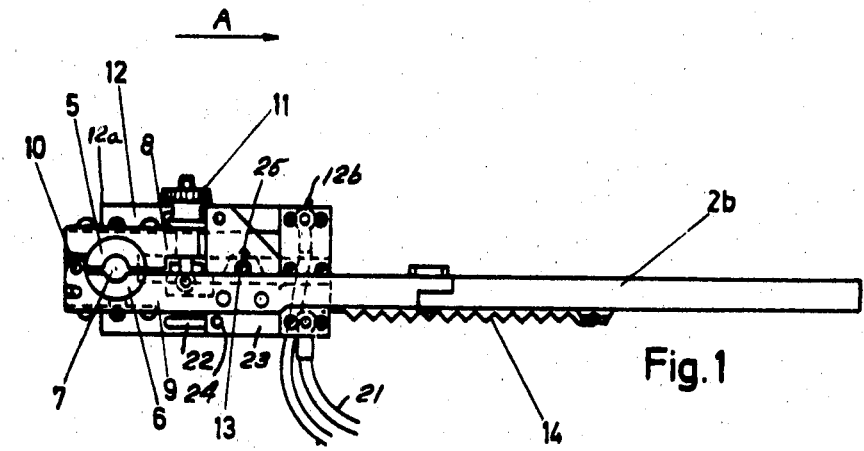

United States Patent

[11] 3,624,348

| [72] | Inventor | Robert Berset |
| | | Le Landeron, Switzerland |
| [21] | Appl. No. | 865,753 |
| [22] | Filed | Oct. 13, 1969 |
| [45] | Patented | Nov. 30, 1971 |
| [73] | Assignee | Ramseyer & Cie S.A. |
| | | Le Landeron, Switzerland |

[54] TOOL FOR WELDING TOGETHER PLASTICS MATERIALS
3 Claims, 3 Drawing Figs.

[52] U.S. Cl. .................................................. 219/243,
156/579, 219/227
[51] Int. Cl. ............................................................ H05b 1/00
[50] Field of Search ............................................ 219/227,
236, 243; 156/304, 306, 579, 583, 499

[56] References Cited
UNITED STATES PATENTS
2,379,500  7/1945  Steffens ..................... 156/304 X
2,384,014  9/1945  Cutler ........................... 156/499 X
3,013,925  12/1961 Carsen ......................... 156/499 X
3,200,028  8/1965  Chisholm .................... 156/579 X
3,359,151  12/1967 Hall .............................. 156/579 X FOREIGN PATENTS
502,447  11/1954  Italy ............................. 219/243

Primary Examiner—J. V. Truhe
Assistant Examiner—C. L. Albritton
Attorney—Raymond A. Robic

ABSTRACT: A pair of pincers are provided with means for gripping pieces of plastics material to be welded together. A heated plate is moveably attached to one of the pincer arms and is held between the pieces of plastics material by a pin on the other pincer arm until melting of the plastics material occurs. By opening the pincers, the plate is retracted by spring means and upon reclosing the pincers the pieces of material are pressed into welding contact.

PATENTED NOV 30 1971          3,624,348

INVENTOR
Robert BERSET

ATTORNEY

TOOL FOR WELDING TOGETHER PLASTICS MATERIALS

This invention relates to the welding together of plastics materials and is particularly, but not exclusively, concerned with the end-to-end welding of sections such as strips in a supple plastics material, for example P.V.C. or synthetic rubber. Such strips may have round or polygonal cross sections and the welding together thereof presents certain problems.

These strips are generally welded by placing the two edges to be welded on a heated part, for example a heated plate, and once these edges have melted, they are pressed together. However, it is not possible in this manner to obtain a regular and clean welding, on the one hand because of the difficulty of accurately joining the two parts, and on the other hand because of the danger of combustion which exists upon fusion.

It is therefore an object of the invention to provide a tool which enables a rapid, clean and accurate welding together of sections in plastics materials.

According to the invention, there is provided a tool for welding together plastics material comprising means for gripping two pieces of plastics material to be welded together, heating means adapted to be held between said two pieces and to melt a part of each piece, means for retracting said heating means from between said pieces, and means for approaching together said gripping means to press said pieces into welding contact.

Figure 2:
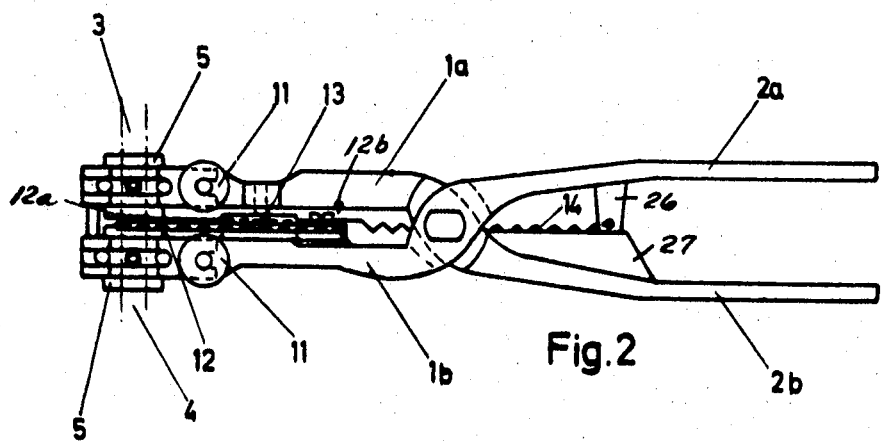
Figure 3:
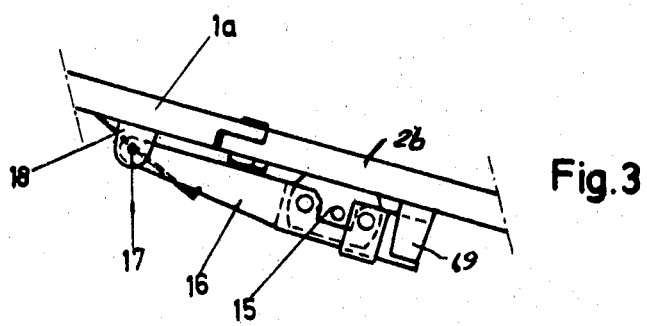

The invention will now be particularly described, by way of example, with reference to the accompanying drawings, in which:

FIG. 1 is a schematic side view of a first embodiment thereof,
FIG. 2 is a plan view of the embodiment of FIG. 1, and
FIG. 3 is a variant of a tool according to the invention. The tool shown in FIGS. 1 and 2 is formed of a pair of pincers articulated at 20 and comprising two operative arms 1a and 1b and two manipulating arms 2a and 2b. The operative arms 1a, 1b each carry a gripping device for an extremity of the plastics strips 3, 4, schematically shown in dotted-dashed lines in FIG. 2.

The gripping devices are each constituted of two semicylindrically shaped parts 5,6 defining a hollow central aperture 7 which corresponds to the cross-sectional shape of the plastics strips and is of slightly larger cross section then these latter. The strip in the described case has a circular cross section, but it is clear that it could have a square, rectangular, trapezoidal or any other shape cross section.

These gripping parts 5, 6 are attached in two fixing parts 8,9 articulated at 10 and which have openings corresponding to the outer dimensions of the two gripping parts 5, 6. These two parts 8, 9 are fixed in their operative positions, for example as shown, by two nuts with knurled heads 11. The parts 8, 9 are removable and it is of course possible to provide the tool with a set of interchangeable fixing parts each with a hollow gripping part corresponding to a strip of particular cross-sectional shape and dimensions.

The two ends of the strips 3, 4 are introduced into the hollow aperture 7 and the nuts 11 are tightened thus fixing these two ends in the gripping devices.

The tool comprises a retractable heating element constituted by a blade 12 which can be heated by supplying low voltage current through cables 21.

Blade 12 is provided with slots 22 which cooperate with pins 24 on a plate 23 fixed on arm 1b so that the blade can slide with limited movement lengthwise of the pincers.

In FIGS. 1 and 2 the blade 12 is shown in one extreme position with its end 12a between the ends of strips 3 and 4. When the pincers are closed, the blade 12 is maintained in this position by a pin 13 on arm 1a which cooperates with a hole 25 in the blade.

A spring 14 is extended between a part 26 on arm 2a and end 12b of blade 12 and urges the blade in the direction of arrow A (FIG. 1).

While the end 12a of the heating blade is between the two ends of the strips 3 and 4 it is heated by a low voltage current. After a certain time the parts of strips 3 and 4 adjacent blade 12 melt and the blade is retracted, as hereinbelow described.

A slight opening of the arms 1a and 1b removes pin 13 from hole 25 and thus allows blade 12 to be retracted in the direction of arrow A under the action of spring 14. Advantageously, a spring, not shown, is provided to constantly urge apart the pairs of arms 1a, 1b and 2a and 2b. The end 12a of the blade is thus removed from between the ends of strips 3 and 4 and by pressing together arms 2a and 2b arms 1a and 1b are approached together and press the melted ends of strips 3 and 4 into welding contact. A part 27 on arm 2b acts as an abutment to prevent any over-compression of the melted ends of strips 3 and 4, thereby ensuring a clean weld.

It is to be noted that the ends of the strips 3, 4 do not contact the end 12a of the heating blade which heats these ends by convection.

The two strip ends can be the two ends of one strip in a manner to make an endless loop from this strip. Such loops find numerous uses, for example as driving belts or as elastic packing rings for certain apparatus.

In the variant of FIG. 3 a cutter is provided for cutting the ends of the strips 3 and 4 in order to provide suitable matching surfaces for welding. This cutter comprises a blade 15, for example a standard one-edged razor blade, mounted on an arm 16 which articulates about a pin 17 by means of which it is attached to a projection 18 on arm 1a. Arm 16 normally clips against a member 19 on arm 2b. Prior to introduction in a gripping member, a strip is cut by placing it on arm 2b and cutting its end off by means of blade 15.

It is also to be noted that the pincers could be arranged with an articulation contrary to that illustrated, i.e. so that pressing together arms 2a, 2b separates arms 1a, 1b. It is additionally possible, within the scope of the invention, to provide a tool with nonarticulated means for separating the gripping members and retracting the heating blade.

I claim:

1. A tool for welding together two plastic parts, which comprises:
   - gripping means having two jaws provided with hollow members in which one end of each plastic part is inserted and handles for actuating the jaws;
   - a heating blade retractably engaged between the said two jaws and adapted to bring the said one end of the plastic parts of their melting point;
   - spring means comprising a spring extending between the handles and the blade, the said spring being under tension for engaging the said blade between the said members, the said spring adapted to suddenly release its tension when the jaws are slightly spread apart whereby the blade is retracted.

2. A tool as described in claim 1, comprising a cutting device mounted on one handle for cutting the ends of the plastic parts.

3. A tool as recited in claim 1, wherein the hollow parts are replaceably mounted for receiving the said one end of the plastic parts having various dimensions.

* * * * *